United States Patent
Moreno Cruz

(10) Patent No.: US 12,286,911 B2
(45) Date of Patent: Apr. 29, 2025

(54) UREA CRYSTAL DETECTION BY MONITORING A RATIO BETWEEN A NOx SENSOR SIGNAL AND A EQUIVALENCE RATIO

(71) Applicant: VOLVO TRUCK CORPORATION, Gothenburg (SE)

(72) Inventor: Jacob Raul Moreno Cruz, Herrljunga (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/341,878

(22) Filed: Jun. 27, 2023

(65) Prior Publication Data

US 2024/0003284 A1 Jan. 4, 2024

(30) Foreign Application Priority Data

Jul. 4, 2022 (EP) .................................... 22182726

(51) Int. Cl.
*F01N 11/00* (2006.01)
*F01N 3/20* (2006.01)

(52) U.S. Cl.
CPC ............ *F01N 11/00* (2013.01); *F01N 3/2073* (2013.01); *F01N 3/208* (2013.01); *F01N 2560/026* (2013.01); *F01N 2610/02* (2013.01)

(58) Field of Classification Search
CPC .............. F01N 11/00; F01N 2560/025; F01N 2560/026; F01N 2610/02;

(Continued)

(56) References Cited

U.S. PATENT DOCUMENTS

2013/0192206 A1 8/2013 Keghelian et al.
2015/0128565 A1 5/2015 Upadhyay et al.

FOREIGN PATENT DOCUMENTS

DE 102019115658 * 6/2020
EP 2813693 A2 12/2014

(Continued)

OTHER PUBLICATIONS

Extended European Search Report in corresponding European Application No. 22182726.4 dated Oct. 4, 2022 (7 pages).

*Primary Examiner* — Phutthiwat Wongwian
*Assistant Examiner* — Diem T Tran
(74) *Attorney, Agent, or Firm* — Venable LLP; Jeffri A. Kaminski

(57) ABSTRACT

A computer-implemented method for detecting and reducing the amount of urea crystals in an exhaust aftertreatment system including at least one NOx sensor upstream of a urea injector is provided, The method includes: acquiring measurement values from the NOx-sensor; determining lambda values associated with the measurement values, wherein a lambda value being indicative of a ratio between an amount of air and an amount of fuel in a combustion chamber of an engine connected to the exhaust aftertreatment system; determining at least one ratio between the measurement values and the inverse of the determined lambda values, when the ratio between the measurement values and an inverse of the determined lambda values is equal to or exceeds a threshold, using a NOx engine emissions model for urea dosing control in the exhaust aftertreatment system.

14 Claims, 5 Drawing Sheets

(58) Field of Classification Search
CPC ..... F01N 2900/1402; F01N 2900/1806; F01N 3/2066; F01N 3/2073; F01N 3/208; F01N 9/005; Y02A 50/20
See application file for complete search history.

(56) References Cited

FOREIGN PATENT DOCUMENTS

| | | |
|---|---|---|
| EP | 2813693 A3 | 11/2015 |
| GB | 2448993 A | 11/2008 |
| WO | 2018022887 A1 | 2/2018 |
| WO | 2018182486 A1 | 10/2018 |
| WO | 2020205112 A1 | 10/2020 |

* cited by examiner

UREA CRYSTAL DETECTION BY MONITORING A RATIO BETWEEN A NOx SENSOR SIGNAL AND A EQUIVALENCE RATIO

TECHNICAL FIELD

The present disclosure relates to a method for detecting and reducing the amount of urea crystals in an exhaust aftertreatment system of a vehicle. The present disclosure also relates to a corresponding exhaust aftertreatment system, a vehicle, a computer program, and a control unit. Although the method and system will be described in relation to a vehicle in the form of a truck, the method and system can also be efficiently incorporated in other vehicle types such as busses, light-weight trucks, passenger cars, construction equipment, marine vessels, and industrial equipment.

BACKGROUND

For a diesel engine a catalytic unit such as a selective catalytic reduction (SCR) device is often used together with a urea dosing system for reducing the emission of hazardous nitrogen oxides such as NO and NO2. More specifically, urea pyrolysis and HNCO hydrolysis converts urea to ammonia, NH3. Ammonia then reacts with hazardous NO and NO2 to produce harmless N2 and H2O inside the selective catalytic reduction device.

However, an unavoidable bi-reaction that occurs causes urea deposits to form on different surfaces of the aftertreatment system. The urea deposits may for example include biuret, triuret, melamine, ammeline, ammelide and cyanuric acid, and typically get stuck on metal surfaces and build up deposits or crystals. In severe cases, an exhaust pipe may be close to completely clogged by such crystals.

When the urea crystals sublimate after a cold start, the upstream NOx sensor reads the NH3 molecules released by these crystals as NOx due to a cross sensitivity of the sensor. Urea injection is based mainly in upstream NOx sensor readings, so when the NOx sensors read a relatively high level because of NH3 vapours, a controller (ECU) commands higher urea dosing which makes the crystal formation even worse.

Urea crystals can also impact the system out emissions while sublimating and release an extra dose of ammonia to the SCR which may not be able handle the extra ammonia which leads ammonia slip though the SCR. This excess of ammonia, or ammonia slip, is detected in the downstream NOx sensor. If the excess of ammonia is detected during the OBD diagnostic related to SCR efficiency, it can lead to a false positive and unnecessary hardware replacements.

Furthermore, the effect of large crystals build-up can impact the upstream NOx sensor diagnostic and diesel particulate filter pressure sensor diagnostics. In these cases, diagnostics trouble codes appear, and the workshop may replace components that in fact are functional, which lead to unnecessary cost, waste in components, and unnecessary downtime of the vehicle.

Accordingly, there is a need for improvements with regards to detecting and reducing the amount of urea crystals in exhaust aftertreatment systems of vehicles.

SUMMARY

An object of the invention is to provide a method and system for detecting and reducing the amount of urea crystals in an exhaust aftertreatment system of a vehicle that at least partly alleviates the deficiencies with the prior art.

According to the first aspect of the invention, there is provided a computer-implemented method for detecting and reducing the amount of urea crystals in an exhaust aftertreatment system comprising at least one NOx sensor upstream of a urea injector, the method comprises: acquiring measurement values from the NOx-sensor; determining lambda values associated with the measurement values, wherein a lambda value being indicative of a ratio between an amount of air and an amount of fuel in a combustion chamber of an engine connected to the exhaust aftertreatment system; determining at least one ratio between the measurement values and the inverse of the determined lambda values, when the ratio between the measurement values and the inverse of the determined lambda values is equal to or exceeds a threshold, using a NOx engine emissions model for urea dosing control in the exhaust aftertreatment system.

Due to the cross-sensitivity of NOx sensor, the acquired NOx-level measurements from the NOx-sensor are indicative of NH3 molecules released by the urea crystals and is detected by the NOx-sensor as NOx. In other words, the NOx sensor reads NH3 molecules as NOx and cannot reliably distinguish among NO, NO2, NH3 molecules. Urea crystals initially grow downstream the NOx sensor and as the urea crystals grow, they start reaching the upstream area and eventually also the area upstream the NOx sensor. Once they sublimate upstream the NOx sensor, due to an increase in exhaust temperature, usually above 350 C, the urea vapours reach the NOx sensor together with the NOx molecules, leading to a high reading of NOx. The emissions controller is thus provided with inaccurate information concerning the actual NOx levels. Consequently, the controller commands higher urea dosing to compensate, but this would instead lead to stimulating crystal growth even more.

The amount of NOx-formation depends on several factors including the lambda value. The lambda value is a ratio between air and diesel in the combustion chamber. Other factors will to a lesser degree affect the NOx formation such as combustion chamber temperature, i.e., the higher the temperature the higher the NOx formation in the combustion, and the exhaust gas ratio (EGR %), i.e., the percentage of exhaust gases from the total mass induced into the engine. However, the lambda value has the highest impact on NOx formation. It was realized by the inventor that NOx formation and the inverse of lambda value has a known relationship. The inverse of lambda is referred to as the equivalence ratio or "phi", cp. In particular, it was realized that the relation between NOx formation (e.g., in ppm of exhaust gas mass) and equivalence ratio is linear over a relatively large range of NOx formation and equivalence ratio, especially for diesel engines. The leaner (lambda>1) the air/diesel mixture the more NOx the engine produces. Equivalence ratios close to 0 mean no combustion, if there is no combustion then the engine is not producing any NOx.

The inventors realized to take advantage of the known linear relationship and the cross-sensitivity of NOx sensors to evaluate whether the NOx engine emissions model or the NOx sensor should be used as control means for the dosing of urea.

The relationship between NOx formation and the equivalence ratio (1/lambda) is accurate for exhaust gas with no ammonia (NH3), in other words, the measurement value acquired by the NOx sensor correlates with the equivalence ratio. The inventors realized to take advantage of that once ammonia crystals start to sublimate as the exhaust temperature increases after cold start, the upstream NOx sensor reads the NH3 molecules as NOx due to the cross-sensitivity of the NOx sensor. This leads to that the linear relation between the equivalence ratio and NOx measurements now influenced by the cross-sensitivity, is no longer accurate. The larger the urea crystals the more NH3 they release and the ration between NOx sensor measurement values and the equivalence ratio deviates more and more over time as crystallization increases.

Thus, by monitoring the ratio between the measurement values provided by the NOx sensor and the associated equivalence ratio and comparing the ratios to a threshold derived from the linear relationship, it can be determined to use NOx engine emissions model for urea dosing control instead of other less reliable methods in that regime of NOx formation that rely on the NOx levels measured by the NOx sensor.

The threshold is determined by the known relationship between the NOx formation and the equivalence ratio (1/lambda). In the linear regime of the relationship, the threshold is the gradient or inclination of the linear relationship, more precisely the threshold is set by the gradient or inclination of the linear function or plot between the NOx formation and the equivalence ratio. Thus, using the equivalence ratio on the x axis, while the y axis is the NOx measurement value.

Thus, by the provision of the herein proposed method, urea deposits can be reduced by monitoring the relation between the measurement value acquired from the NOx sensor and the corresponding equivalence ratio preferably determined from the measurements of the NOx-sensor. If the linear relationship between the measurement values of the NOx sensor and the corresponding equivalence ratios is violated, as indicated by the ratio exceeding or being equal to the threshold, a NOx engine emissions model is used for urea dosing control in the exhaust aftertreatment system.

That urea deposits are sublimed may also be termed "decomposed" and means that the solid urea deposits are vaporized or "melted".

The term "NOx" refers to nitrogen oxides.

NOx sensors are commonly used in exhaust gas aftertreatment systems of vehicles and are configured to detect and measure the levels of nitrogen oxides in the exhaust gas. NOx sensors are considered known per se and details about their operation and functionality will not be described in detail herein.

The engine of the vehicle is preferably an internal combustion engine. The internal combustion engine may be diesel engine or a gasoline engine or any other type of internal combustion engine. The internal combustion engine may be part of a hybrid driveline partly powered by a battery. Preferably, the engine is a diesel engine, and the fuel is diesel.

A catalytic reduction device is generally a device able to reduce the level of nitrogen oxides in exhaust aftertreatment systems of vehicles. Various types of catalytic reduction devices are per se known and are conceivable options for embodiments of the present invention, and some examples are selective catalytic reduction devices, lean nitrogen oxide traps, hydrogen-carbon selective catalytic reduction devices and a selective catalytic reduction-coated diesel particulate filter.

The level of nitrogen oxides may be defined in different ways and is not limited as such. For example, the level of nitrogen oxides may be a relative amount, e.g., a ppm of the total amount of exhaust gas flow, or the level of nitrogen oxides may be nitrogen oxide flow, e.g., measured as mass/unit time, for example, gram/second.

According to an example embodiment, the method may comprise if one of the determined ratios is below the threshold, using a measurement value from the NOx sensor for urea dosing control in the exhaust aftertreatment system. Once one ratio is below the threshold, the method uses readings from the NOx sensor for urea dosing control. In other words, once the linear relationship between the measurement values of the NOx sensor and the corresponding lambda values is restored, or are initially concluded to be linear, the urea dosing control will use the NOX sensor readings as its main input.

According to an example embodiment, the method may comprise if one of the determined ratios is equal to or exceeds the threshold, switching from using the NOx sensor for urea dosing control in the exhaust aftertreatment system to using the NOx engine emissions model for urea dosing control in the exhaust aftertreatment system. Thus, the urea dosing control advantageously switches adaptively between using the NOx sensor measurement values and the NOx engine emissions model to continuously adapt the urea dosing to the presently most reliable source of control. The switching depends on whether the ratio exceeds or is equal to or is below the threshold.

According to an example embodiment, the method may comprise if one of the determined ratios is below the threshold, switching from using the NOx engine emissions model for urea dosing control in the exhaust aftertreatment system to using the NOx sensor for urea dosing control in the exhaust aftertreatment system. Similar to the above, the urea dosing control advantageously switches adaptively between using the NOx sensor measurement values and the NOx engine emissions model to continuously adapt the urea dosing to the presently most reliable source of control.

According to an example embodiment, the method may comprise if one of the determined ratios is equal to or exceeds a second threshold, calculating an integral of the determined ratios over the period of time, wherein, if the integral is equal to or exceeds a predetermined level, increasing the temperature of exhaust gas to sublime urea crystal in the exhaust aftertreatment system. In other words, the method can also lead to a request of extra heat from the engine in case the relation between the measurement value and the lambda value is at certain calibrated level that urea crystals are high enough to affect e.g., fuel consumption.

Preferably, the method steps may be continuously repeated for a time period after a cold start.

According to an example embodiment, the threshold may be determined by an on-board diagnostics model. The threshold is set based on the combustion characteristics of the present engine. Thus, for a given engine the specific relationship between NOx formation and equivalence ratio is established to find the threshold for the specific engine. The relationship may be calibrated to take sensor tolerances and lambda vs NOx delay (lambda typically evolves faster than the NOx value variations) into account. The threshold, or inclination of the linear relationship between NOx and 1/lambda may be calculated for each engine once and may then be fixed during vehicle operation.

The NOx sensor is advantageously arranged upstream of catalytic conversion units of the exhaust aftertreatment system.

In embodiments, the measurement values are continuously acquired, and ratios are continuously determined while the method is operative, wherein, once a ratio is equal to or exceeds the threshold, using a NOx engine emissions model for urea dosing control in the exhaust aftertreatment system, and once a ratio is determined to be below the threshold, using a measurement from the NOx sensor for urea dosing control in the exhaust aftertreatment system.

It is understood that the method is operative when the NOx sensor is operating reliably with no fault codes produced associated with the operation of the NOx sensor.

According to the second aspect of the invention, there is provided an exhaust aftertreatment system of a vehicle comprising: at least one NOx sensor upstream of a urea injector; and a control unit configured to: acquire measurement values from the NOx-sensor; determine lambda values, wherein a lambda value being indicative of a ratio between an amount of air and an amount of fuel in a combustion chamber of an engine connected to the exhaust aftertreatment system; determine at least one ratio between the measurements values and the inverse of the determined lambda values, if one of the determined ratios between the measurement values and the inverse of the determined lambda values is equal to or exceeds a threshold, use a NOx engine emissions model for urea dosing control in the exhaust aftertreatment system.

Effects and features of the second aspect of the invention are largely analogous to those described above in connection with the first aspect.

According to a third aspect of the invention, there is provided a vehicle comprising the exhaust aftertreatment system according to the second aspect.

According to a fourth aspect of the invention, there is provided a computer program comprising program code means for performing the steps of the first aspect when the program is run on a computer.

According to a fifth aspect of the invention, there is provided a computer readable medium carrying a computer program comprising program code means for performing the steps of the first aspect when the program product is run on a computer.

According to a sixth aspect of the invention, there is provided a control unit, the control unit being configured to perform the steps of the method according to the first aspect.

Effects and features of the third, fourth, fifth, and sixth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
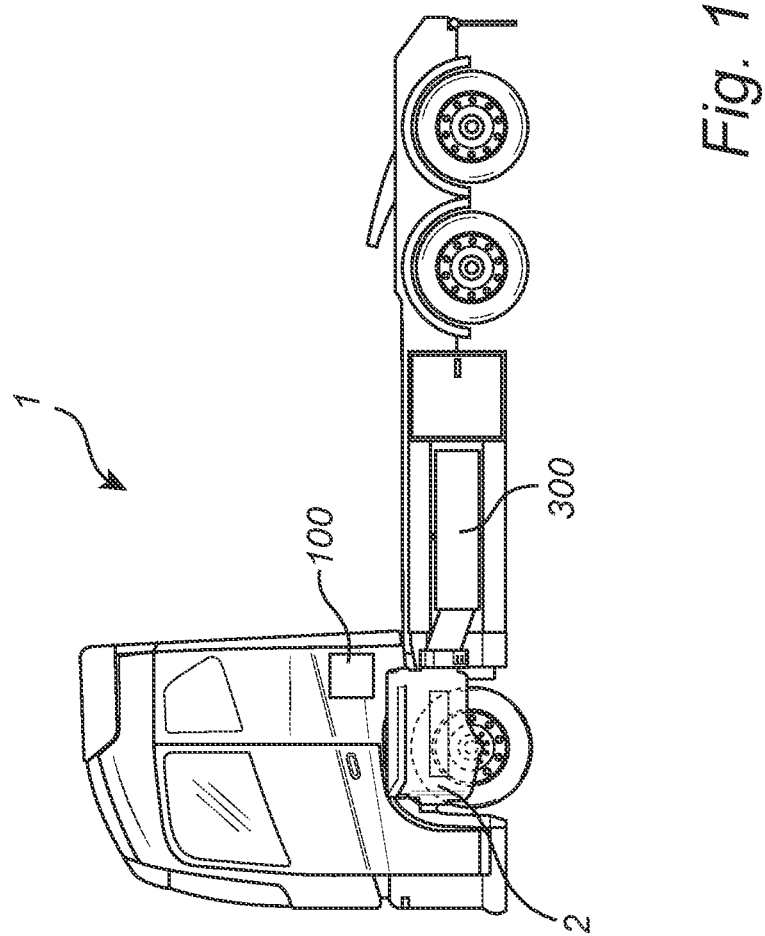
FIG. 1 is a vehicle in the form a truck according to example embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Like reference character refer to like elements throughout the description.

FIG. 1 illustrates a vehicle in the form of a truck 1 comprising an engine 2 such as or example an internal combustion engine. The truck 1 further comprises a control unit 100 and an exhaust gas aftertreatment system 300 including catalytic devices such as selective catalytic reduction units. Further, exhaust gas aftertreatment system 300 includes e.g., urea injectors, nitrogen oxide sensors, and often particulate filters.

Figure 2:
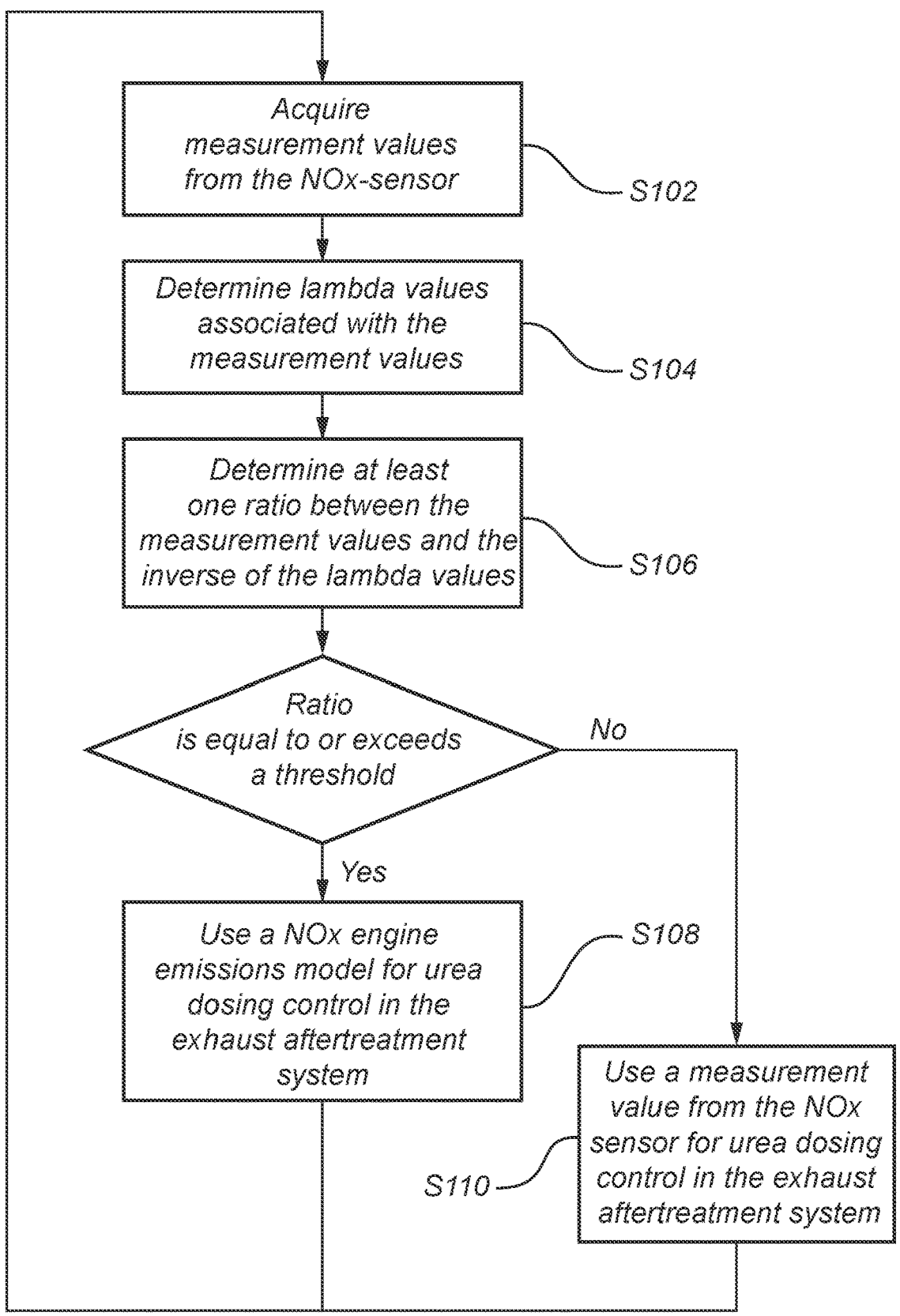
FIG. 2 is a flow-chart of method steps according to example embodiments of the invention.
Figure 3:
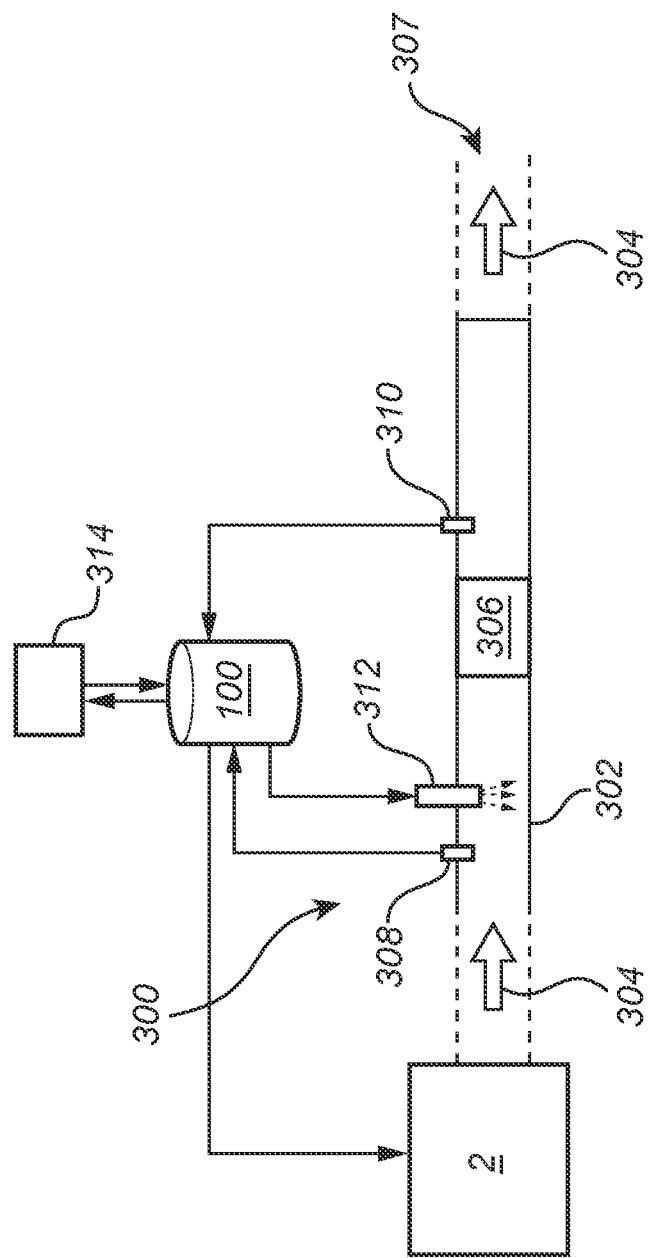
FIG. 3 is a schematic illustration of an exhaust aftertreatment system according to example embodiments of the invention.

FIG. 2 is a flow-chart of method steps according to embodiments of the invention and FIG. 3 conceptually illustrates an exhaust aftertreatment system 300 according to embodiments of the invention.

The exhaust aftertreatment system 300 comprises an exhaust pipe section 302 for transferring exhaust gas 304 towards an exhaust gas outlet 307. The exhaust pipe section 302 is part of a larger transfer system for transferring exhaust gas from the engine 2 to an exhaust gas outlet 307. The aftertreatment system 300 comprises a catalytic reduction device 306 e.g., a selective catalytic reduction device arranged in the exhaust gas flow for receiving exhaust gas 304. Further, the aftertreatment system 300 comprises a NOx sensor 308 upstream of the catalytic reduction device 306 for measuring inflow levels of NOx to the catalytic reduction device 306. Although not strictly necessary for the present disclosure it is often the case that a second NOx sensor 310 is arranged downstream of the catalytic reduction device 306 for measuring outflow levels of NOx from the catalytic reduction device 306. The inflow level of NOx is the amount of NOx that enters the catalytic reduction device 306. The outflow level of NOx is the amount of NOx that is left directly downstream of the catalytic reduction device 306. Although not explicitly denoted, the aftertreatment system 300 includes means for, that are controllable by the control unit 100, enabling heating the catalytic reduction device 306, for example, by performing a regeneration process, increasing vehicle engine load and speed by controlling the engine 2, and increasing a pressure across the catalytic reduction device 306 by controlling an outflow throttle of the catalytic reduction device 306.

Further, the aftertreatment system 300 comprises a urea injector 312 downstream of the NOx sensor 308 and upstream of the catalytic reduction device 306 and that is configured to inject urea stored in a urea storage. Although not explicitly illustrated, the aftertreatment system 300 may comprise e.g., ammonia-slip catalysts, diesel oxidation catalyst, particulate filters, exhaust gas temperature sensors, and other components that are per se known to the skilled person and will not be described in detail herein.

The method descried herein is a computer-implemented method for detecting and reducing the amount of urea crystals in an exhaust aftertreatment system 300 comprising at least one NOx sensor 308 upstream of a urea injector 312.

Urea crystals initially grow downstream the NOx sensor 308 where the urea injector 312 is located. Initially, the urea crystal growth does not reach the NOx sensor 308 which means the NOx sensor 308 measure the NOx-levels correctly. However, as the urea crystals grow, they reach upstream and eventually also the upstream NOx sensor 308. When the urea crystals sublimate upstream the NOx sensor, due to an increase in exhaust temperature the urea vapours reach the NOx sensor 308 along with the NOx molecules, leading to a high reading of NOx due to the cross-sensitivity of NOx-sensors, which may lead to that the controller 100 commands higher urea dosing to compensate unless other actions are taken as will be addressed herein. The inventors realized to take advantage of the cross-sensitivity and known relationships between NOx formation and 1/lambda known as the equivalence ratio.

In step S102 of the present disclosure, measurement values are acquired by the control unit 100 from the NOx-sensor. Depending on the stage of urea crystal growth, the measurement values are indicative of various portions of NH3 molecules released by the urea crystals, detected by the NOx-sensor 308 as NOx, and real NOx molecules. Thus, the acquired measurement values from the NOx-sensor 308 are indicative of NH3 molecules released by the urea crystals and NOx levels in the exhaust gas.

In step S104, the control unit 100 determines lambda values associated with the measurement values. A lambda value is indicative of a ratio between an amount of air and an amount of fuel, preferably diesel, in a combustion chamber of the engine 100 connected to the exhaust aftertreatment system 300. Typically, a lambda value is received from the NOx sensor 308 along with the NOx measurement value.

In step S106, at least one ratio between the measurement values from the NOx sensor 308 and the inverse of the determined lambda values is determined by the control unit 100.

When the ratio between the measurement values and an inverse of the determined lambda values is equal to or exceeds a threshold, a NOx engine emissions model 314 is used by the control unit 100 in step S108 for urea dosing control in the exhaust aftertreatment system. However, if a determined ratio between the measurement values and an inverse of the determined lambda values is below the threshold, the measurement value from the NOx sensor is instead used by the control unit 100 in step S110 for urea dosing control in the exhaust aftertreatment system 300. The control unit 100 is configured to control the urea injector 312 for performing urea dosing control in the exhaust aftertreatment system 300.

The steps described herein are continuously performed for a time period. The time period may last until the vehicle engine is turned off, or by another specified time period, especially following a cold start. In other words, the control unit 100 continuously monitors the measurement values from the NOx sensor 308 and the associated lambda values and if for example the dosing control is based on the NOx sensor measurement values and if one of the determined ratios is determined to be equal to or exceeds the threshold, the control unit switches from using the NOx sensor 308 for urea dosing control in the exhaust aftertreatment system 300 to using the NOx engine emissions model for urea dosing control in the exhaust aftertreatment system 300. Equally, if the control unit 100 is using the NOx engine emissions model for urea dosing control, and if one of the determined ratios is determined by the control unit 100 to be below the threshold, the control unit 100 switches from using the NOx engine emissions model for urea dosing control in the exhaust aftertreatment system 300 to using the NOx sensor 308 measurement values for urea dosing control in the exhaust aftertreatment system 300.

Accordingly, the control unit 100 is configured to continuously acquire measurement values and continuously determine the ratios as measurement values are acquired. Thus, the method returns to step S102 continuously. Once a ratio is equal to or exceeds the threshold, the control unit 100 uses a NOx engine emissions model according to step S108 for urea dosing control in the exhaust aftertreatment system. Once a ratio is determined to be below the threshold, the control unit 100 uses a measurement from the NOx sensor for urea dosing control in the exhaust aftertreatment system 300 according to step S110.

The threshold is preferably set by an on-board diagnostics model. The on-board diagnostics model establishes the linear relationship between NOx formation and equivalence ratio, and considers sensor tolerances, environmental conditions like altitude and humidity, and other calibration factors when establishing the linear relationship and the threshold therefrom.

Figure 4:
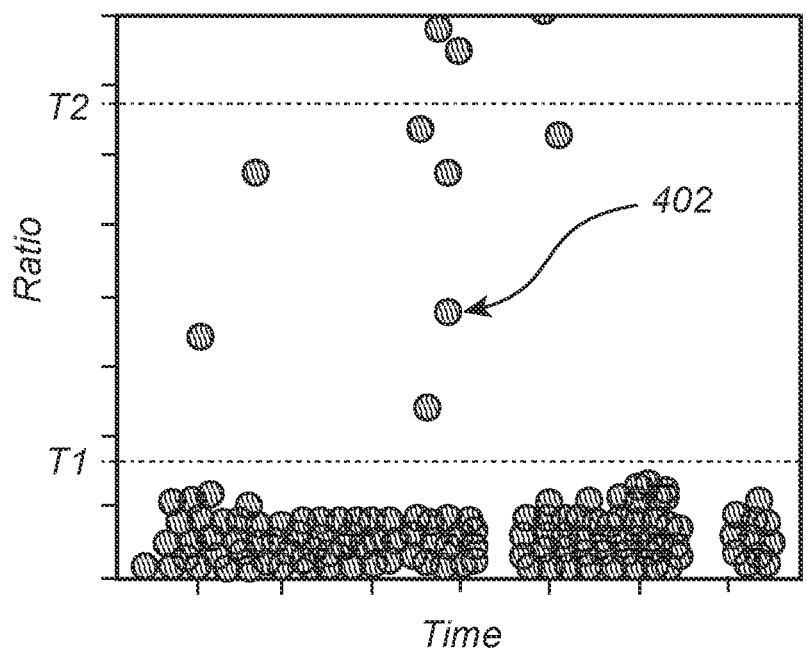
FIG. 4 is a graph showing a ratio as a function of time.

FIG. 4 is a graph showing example ratios between NOx measurement value and equivalence ratios plotted as a function of time. Since the relationship between the equivalence ratio and the NOx-levels are linear, a deviation from linear relationship can be assumed to be due to that the NOx sensor 308 due to its cross-sensitivity to NH3 detects NH3 caused by urea crystals subliming in the vicinity of the NOx sensor 308. Without sublimation the ratios between NOx measurement value and equivalence values are expected to be below the threshold T1. However, when sublimation occurs so that the excess ammonia is detected by the NOx sensor the measurement values from the NOx-sensor to no longer correlate linearly with the determined equivalence ratio, and outliers 402 (only one is denoted) exceeding the threshold T1 appear. When a ratio exceeding or being equal to the threshold T1 is detected the control unit 100 uses the NOx emission model for urea dosing, and when a ratio below the threshold T1 is detected the NOx sensor measurement values are used by the control unit 100 for urea dosing in the exhaust aftertreatment system 300. Using the NOx emission model for urea dosing control prevents further growth of urea crystals and further leads to reducing the amount of urea crystals by taking appropriate actions.

Figure 5:
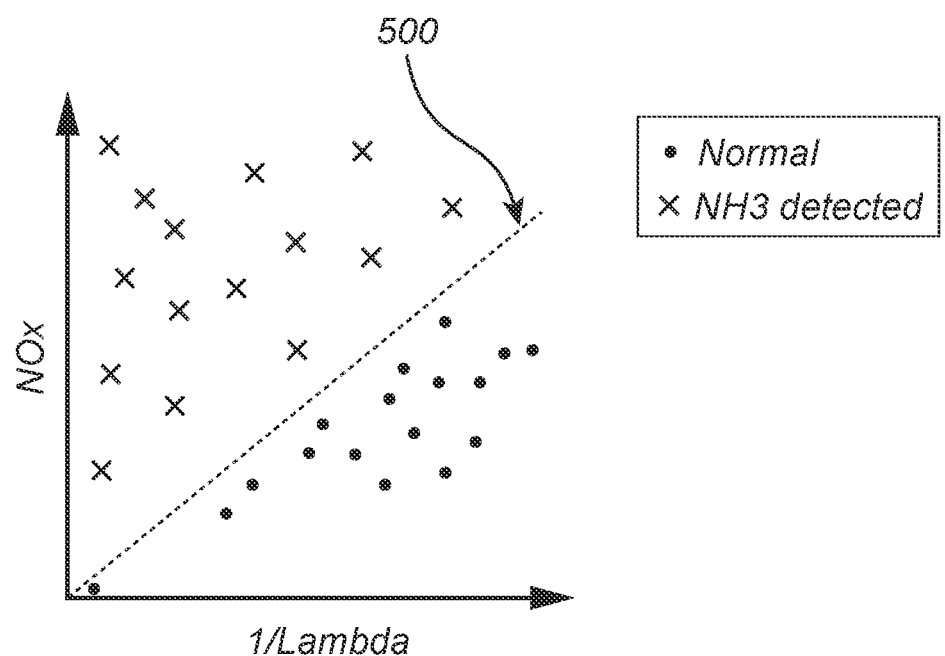
FIG. 5 is a graph showing a conceptual linear relationship between NOx and Lambda.

FIG. 5 shows a conceptual linear relationship between NOx and the equivalence ratio 1/lambda. The slope, k, of the curve NOx=k*(1/Lambda) indicates the ratio between a NOx level and an associated 1/lambda value (equivalence ratio) when the relationship is linear. This curve 500 is ideal in that it crosses origin of the graph. However, in reality sensor tolerances and other conditions are accounted for by appropriate calibration. "Normal" events in the graph in FIG. 5 are indicated as dots and are the events where a ratio between a NOx measurement value and an equivalence ratio is below the line 500. This corresponds to the ratio being below the threshold T1 in FIG. 4 and where the NOx sensor measurement is sufficiently reliable to be used for urea dosing control. However, the crosses, which indicate events where a ratio between a NOx measurement value and an equivalence ratio is above the curve 500 indicate events where the NOx sensor measurement not reliable and instead the control unit 100 uses the NOx emission model for urea dosing. Thus, the crosses being above the line 500 are indicative of that the sensor reading has been influenced by the ammonia vapours. The T1 threshold in FIG. 4 corresponds to the line 500 in FIG. 5, but FIG. 4 is an example of how the ratio can change over time, while FIG. 5 shows 1/Lambda vs NOx, where the line 500 represents the maximum ratio between NOx and 1/lambda that allows using the NOx sensor readings for urea dosing control.

Figure 6:
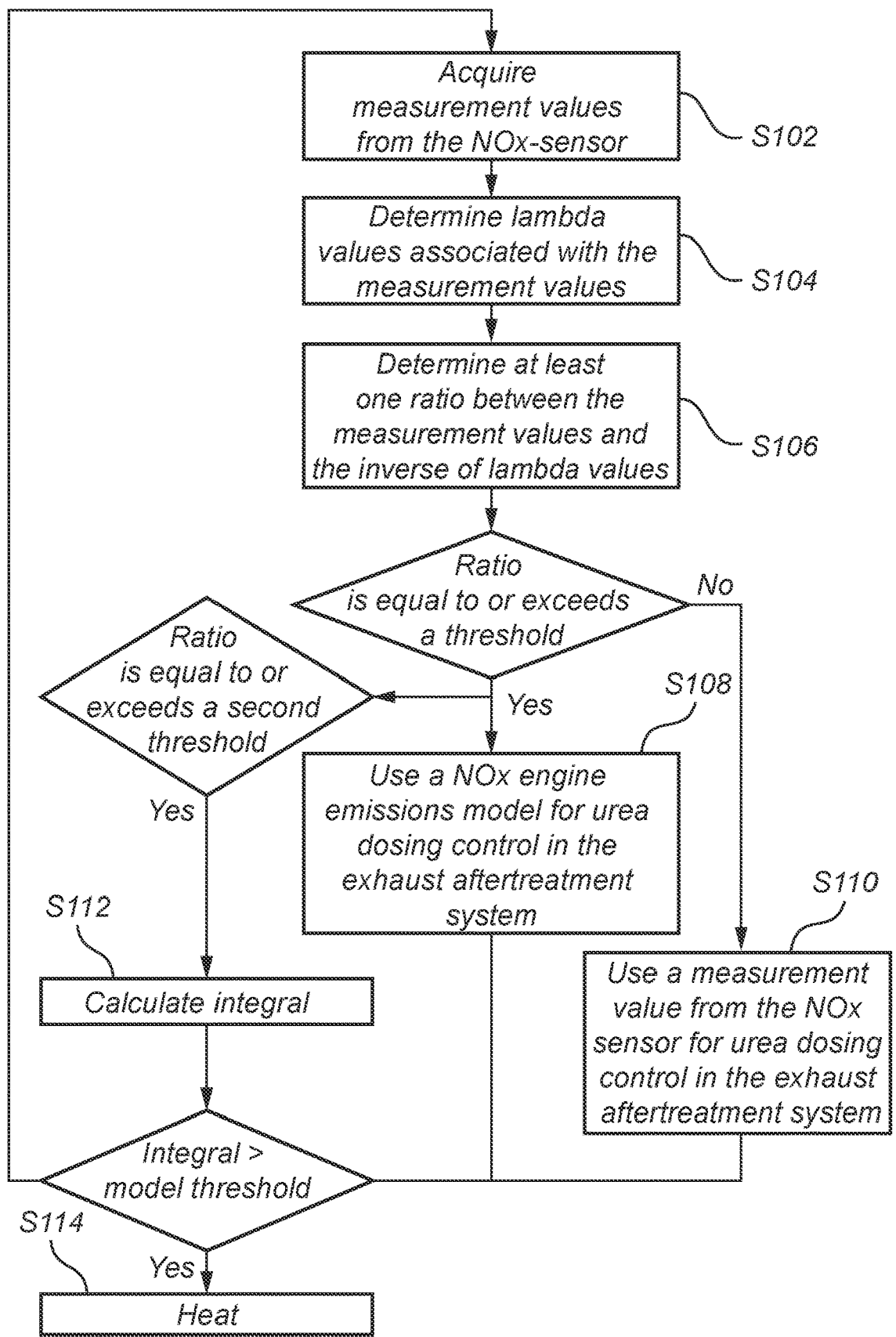
FIG. 6 is a flow-chart of method steps according to example embodiments of the invention.

FIG. 6 is a flow-chart of method steps with additional steps to the flow-chart of FIG. 2. When the ratio is equal to or exceeds the ratio, it is also checked if the ratio exceeds or is equal to a second threshold T2 which is higher than the first threshold T1, see FIG. 4. If this is the case the control unit 100 calculates the integral of the ratio over a period of time in step S112. If the integral, e.g., area under the curve, is equal to or exceeds a predetermined level, the control unit 100 is configured to cause an increase of the temperature of exhaust gas 304 to sublime urea crystal in the exhaust aftertreatment system 300 in step S114. The heating may be provided by various means including means from the following non-exhaustive list: increasing the engine load, increasing fuel injections, injecting fuel to the exhaust flow, or adjusting transmission shift schedule, or adjusting exhaust gas vents, to prevent that urea crystals grow excessively to affect fuel consumption.

The control of the aftertreatment system and means thereof for executing the method described herein is performed by a control unit onboard the vehicle.

A control unit may include a microprocessor, microcontroller, programmable digital signal processor or another programmable device. Thus, the control unit comprises electronic circuits and connections (not shown) as well as processing circuitry (not shown) such that the control unit can communicate with different parts of the truck such as the brakes, suspension, driveline, in particular an electrical engine, an electric machine, a clutch, and a gearbox in order to at least partly operate the truck. The control unit may comprise modules in either hardware or software, or partially in hardware or software and communicate using known transmission buses such as CAN-bus and/or wireless communication capabilities. The processing circuitry may be a general-purpose processor or a specific processor. The control unit comprises a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A computer-implemented method for detecting and reducing an amount of urea crystals in an exhaust aftertreatment system of an engine comprising at least one NOx sensor upstream of a urea injector, the method comprises:
   acquiring NOx measurement values from the at least one NOx sensor;
   determining lambda values received from the at least one NOx sensor along with the NOx measurement values, wherein a lambda value being indicative of a ratio between an amount of air and an amount of fuel in a combustion chamber of an engine connected to the exhaust aftertreatment system;
   determining at least one ratio between the NOx measurement values and an inverse of the determined lambda values, and,
   when the at least one ratio between the NOx measurement values and the inverse of the determined lambda values is equal to or exceeds a first threshold, using a NOx engine emissions model for urea dosing control in the exhaust aftertreatment system.

2. The method according to claim 1, comprising:
   if one of the determined at least one ratio is below the first threshold, using a NOx measurement value from the NOx sensor for urea dosing control in the exhaust aftertreatment system.

3. The method according to claim 1, comprising:
   if one of the determined at least one ratio is equal to or exceeds the first threshold, switching from using the NOx sensor for urea dosing control in the exhaust aftertreatment system to using the NOx engine emissions model for urea dosing control in the exhaust aftertreatment system.

4. The method according to claim 1, comprising:
   if one of the determined at least one ratio is below the first threshold, switching from using the NOx engine emissions model for urea dosing control in the exhaust aftertreatment system to using the at least one NOx sensor for urea dosing control in the exhaust aftertreatment system.

5. The method according to claim 1, further comprising:
if one of the determined at least one ratio is equal to or exceeds a second threshold, calculating an integral of the determined ratios over a period of time, wherein,
if the integral is equal to or exceeds a predetermined level, increasing the temperature of exhaust gas to sublime urea crystals in the exhaust aftertreatment system.

6. The method according to claim 1, comprising continuously repeated for a time period after a cold start.

7. The method according to claim 1, wherein the acquired NOx measurement values from the NOx-sensor are indicative of NH3 molecules released by the urea crystals and NOx levels in the exhaust gas.

8. The method according to claim 1, wherein the first threshold is set by an on-board diagnostics model.

9. The method according to claim 1, wherein the NOx sensor is arranged upstream of a catalytic conversion unit of the exhaust aftertreatment system.

10. The method according to claim 1, wherein the NOx measurement values are continuously acquired, and the at least one ratio is/are continuously determined while the method is operative, wherein,
once a ratio is equal to or exceeds the first threshold, using a NOx engine emissions model for urea dosing control in the exhaust aftertreatment system, and
once a ratio is determined to be below the first threshold, using a NOx measurement value from the NOx sensor for urea dosing control in the exhaust aftertreatment system.

11. A non-transitory computer readable medium carrying a computer program comprising a program code for performing the method of claim 1 when said program code is run on a computer.

12. A control unit, the control unit being configured to perform the method according to claim 1.

13. An exhaust aftertreatment system of a vehicle, comprising:
at least one NOx sensor upstream of a urea injector; and
a control unit configured to:
acquire NOx measurement values from the at least one NOx sensor;
determine lambda values received from the at least one NOx sensor along with the NOx measurement values, wherein a lambda value being indicative of a ratio between an amount of air and an amount of fuel in a combustion chamber of an engine connected to the exhaust aftertreatment system;
determine at least one ratio between the NOx measurement values and the inverse of the determined lambda values,
if one of the determined at least one ratio between the NOx measurement values and the inverse of the determined lambda values is equal to or exceeds a first threshold, use a NOx engine emissions model for urea dosing control in the exhaust aftertreatment system.

14. A vehicle comprising an exhaust aftertreatment system according to claim 13.

* * * * *